(12) United States Patent
Srinivasan et al.

(10) Patent No.: US 7,689,838 B2
(45) Date of Patent: Mar. 30, 2010

(54) METHOD AND APPARATUS FOR PROVIDING FOR DETECTING PROCESSOR STATE TRANSITIONS

(75) Inventors: Vasudevan Srinivasan, Hillsboro, OR (US); Susumu Arai, Portland, OR (US); Barnes Cooper, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 567 days.

(21) Appl. No.: 11/316,541

(22) Filed: Dec. 22, 2005

(65) Prior Publication Data

US 2007/0150759 A1  Jun. 28, 2007

(51) Int. Cl.
*G06F 1/00* (2006.01)
(52) U.S. Cl. ..................................... 713/300
(58) Field of Classification Search ................. 713/300
See application file for complete search history.

(56) References Cited

U.S. PATENT DOCUMENTS

| | | | |
|---|---|---|---|
| 5,872,913 A | 2/1999 | Berry et al. | |
| 6,131,166 A * | 10/2000 | Wong-Insley | 713/300 |
| 6,308,279 B1 * | 10/2001 | Toll et al. | 713/323 |
| 6,622,253 B2 * | 9/2003 | Bacon | 713/322 |
| 7,013,400 B2 * | 3/2006 | Kalla et al. | 713/320 |
| 7,084,810 B2 * | 8/2006 | Kitatani | 342/357.12 |
| 7,272,741 B2 * | 9/2007 | Wilcox et al. | 713/503 |

| | | | |
|---|---|---|---|
| 2002/0026291 A1 | 2/2002 | Lee et al. | |
| 2005/0125789 A1 * | 6/2005 | Dijkstra et al. | 718/100 |

FOREIGN PATENT DOCUMENTS

| | | |
|---|---|---|
| EP | 0426410 A2 | 5/1991 |
| EP | 1555614 A2 | 7/2005 |
| WO | 2007078628 A3 | 7/2007 |

OTHER PUBLICATIONS

U.S. Appl. No. 11/007,098, filed Dec. 7, 2004, System and Method for Adaptive Power.
U.S. Appl. No. 11/006,917, filed Dec. 7, 2004, System and Method for Adaptive Power.
"International Search Report", PCT/US2006/047033, (Dec. 17, 2007),12 pgs.

* cited by examiner

*Primary Examiner*—Thomas Lee
*Assistant Examiner*—Eric Chang
(74) *Attorney, Agent, or Firm*—Kacvinsky LLC

(57) ABSTRACT

In some embodiments, the method and apparatus to provide for the detection of processor transition states is described. Some embodiments include at least two threads which provide detection for high and low priority states, which provide for power state transitions by the operating system: The low priority thread runs just prior to entry into an idle or low power state; the high priority thread runs when the idle state is ended or the highest power state is reached. In some embodiments, the use of these threads provides for the detection of processor state transitions and idle times independently of the operating system. Other embodiments are described.

24 Claims, 6 Drawing Sheets

300

METHOD AND APPARATUS FOR PROVIDING FOR DETECTING PROCESSOR STATE TRANSITIONS

BACKGROUND

1. Technical Field

Some embodiments of the invention generally relate to processor state transitions in a computing system.

2. Discussion

The power consumption of computing systems is becoming an increasingly sensitive issue for many users. In most cases, users desire lower energy bills. Users may also prefer computing systems that generate less noise and heat, and there is typically a positive relationship between the amount of power consumed by a computing system and the amounts of noise and heat generated by that computing system. In addition, for a battery powered computing system such as a laptop computer, a cellular telephone ("cell phone"), a personal digital assistants (PDAs), etc., reducing the power consumption has the valuable effect of increasing the computing system's battery life (i.e., increasing the amount of time the computing system can be used before the battery must be recharged or replaced).

A typical computing system includes many different components, such as a processor or microprocessor, a data storage device, and various input/output (I/O) devices. When a computing system is not off, each component within the computing system may consume some power. Moreover, the increased sophistication of the microprocessor architectures of computing systems has also leveraged power management issues. The logic, such as software applications, which runs on computing systems, may not be aware of the power state of the computing system or its components. This can be problematic when the activities of the software applications are not readily apparent to the user. Furthermore, the logic may be run on different operating systems or versions of operating systems (OSes) and may not be able to obtain power state information from the operating system (OS).

Therefore, there is a need to provide ways for the logic to be made aware of power management states of the computing system. In particular, there is a need for the logic to detect in an OS independent manner when the OS is about to alter the power state of a computing system.

BRIEF DESCRIPTION OF THE DRAWINGS

Various advantages of embodiments of the present invention will become apparent to one of ordinary skill in the art by reading the following specification and appended claims, and by referencing the following drawings, in which:

DETAILED DESCRIPTION

Figure 1:
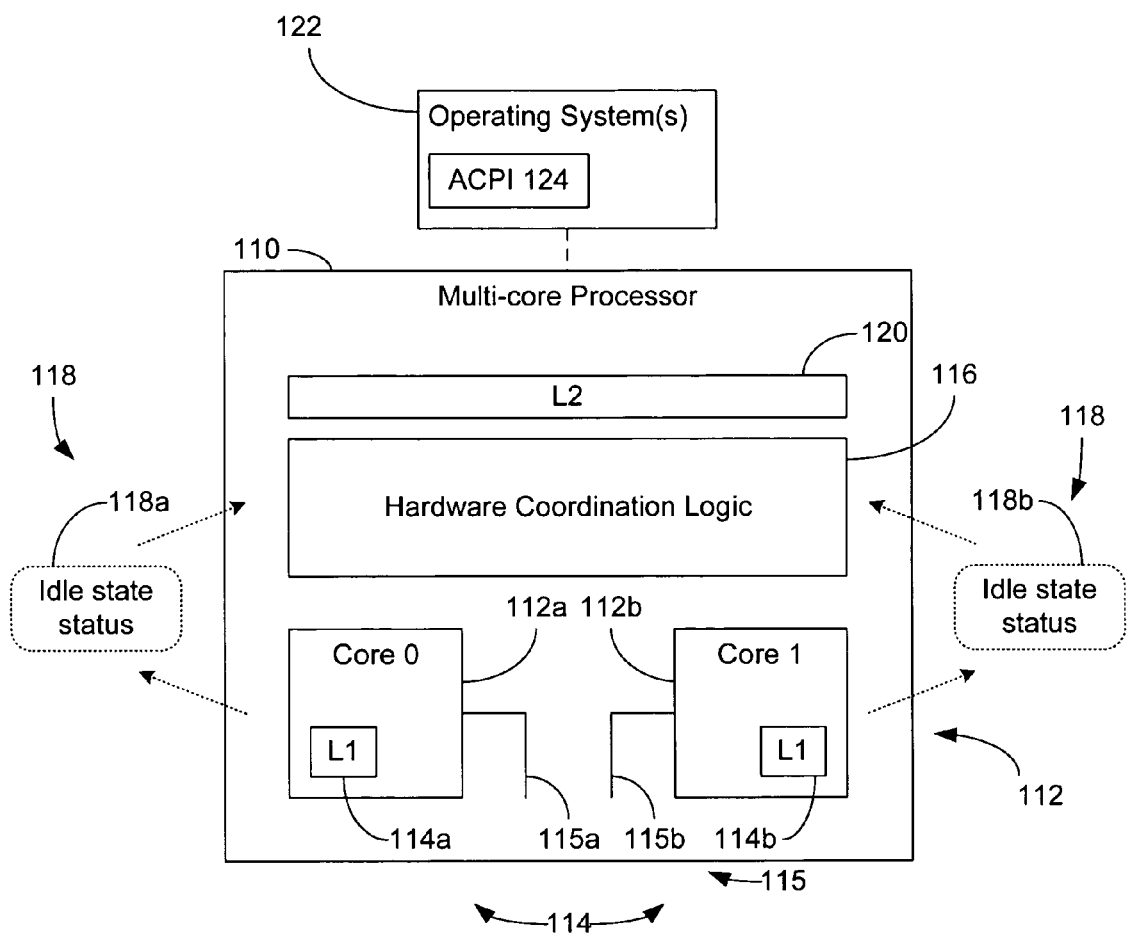
FIG. 1 is a block diagram of an example of a computing system according to some embodiments of the invention.

Reference is made to some embodiments of the invention, examples of which are illustrated in the accompanying drawings. While the present invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims. Moreover, in the following detailed description of the invention, numerous specific details are set forth in order to provide a thorough understanding of the invention. However, the invention may be practiced without these specific details. In other instances, well-known methods, procedures, components and circuits have not been described in detail as not to unnecessarily obscure aspects of the invention.

Some embodiments of the invention are directed to a system and method for detecting processor state transitions, such as, but not limited to computing systems, using single or multiple core processors. Some embodiments of the system may detect various power management states which may be used to effectively detect the idle times of the computing system, or one or more of the single or multiple core processors, such as, but not limited to, various processor power management states, i.e., "C states," that may be supported by computing systems using Advanced Configuration and Power Interface (ACPI) specification, ACPI Ver. 3.0, published Sep. 2, 2004.

Reference in the specification to "one embodiment" or "some embodiments" of the invention means that a particular feature, function, structure or characteristic described in connection with the embodiment is included in at least one embodiment of the invention. Thus, the appearances of the phrase "in one embodiment" or "according to an embodiment" appearing in various places throughout the specification are not necessarily all referring to the same embodiment.

Embodiments of the invention may be implemented in computing systems with single, dual and other multiple core microprocessors, which are getting very sophisticated. Often, these multi core processors contain unique computing resources while sharing a common level 2 (L2) cache and a common package and other features. This may lead to power management issues, such as, but not limited to:

a. Process scheduling may become more complicated as operating systems (OS) may not comprehend that a single package is being shared by multiple processors. This leads to processes being inefficiently scheduled on the available processing cores and thus leading to higher power consumption;

b. Applications run on the computing system may not be categorized as interactive applications (such as, but not limited to, Microsoft's® Excel™ or Word™) vs. background applications (such as, but not limited to, Symantec's® Anti-virus™ or Personal Firewall™). These applications may not get equal opportunity to run and their running may not be necessary, and thus may cause more of power drain. The power drain may be problematic for mobile computing systems which operate using a battery.

Intel® Corporation manufactures processors that incorporate technologies to support low power consumption and high performance processing for a wide range of services. In some cases, the technologies in those processors for supporting low power consumption and high performance processing may be compliant with power management systems such as the ACPI specification. Intel® Corporation may distribute one or more families of processors that feature this or similar technologies under various product designations or model numbers.

In addition, the embodiments of the invention described herein may be used to take advantage of various low power modes that may be supported by the system's hardware, even when those modes are not supported by the system's OS. For example, the processors in the Intel® PXA26x and the Intel® PXA27x processor families include technologies for performance switching. Similar technologies are included in various mobile processors distributed by Intel® Corporation, such as the type of processor referred to as Mobile Intel® Pentium® III Processor—M. The technologies for performance switching included on those processors may be referred to in general as Intel SpeedStep® technology. Embodiments of the present invention may be used to more effectively exploit the power saving possibilities that such technologies support. Alternative embodiments of the invention may be used to enhance the efficiency of processing systems that use other kinds of processors, including processor that use other kinds of performance or power management technologies.

The embodiments of the invention illustrated herein may include computing systems with processors that support the ACPI specification or similar systems. Alternative embodiments of the invention include computing systems with other kinds of processors, whether manufactured by Intel® Corporation or other manufacturers.

Figure 2:
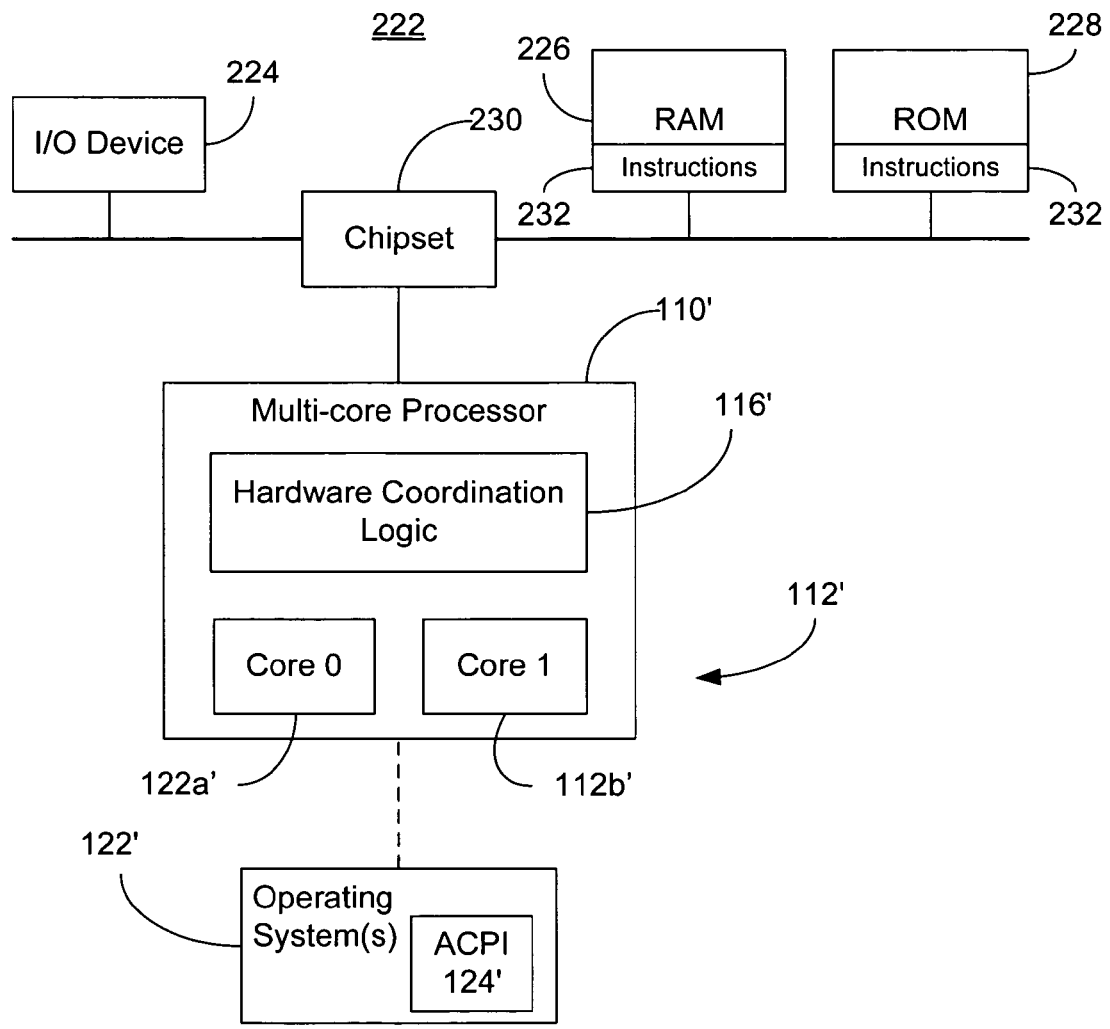
FIG. 2 is a block diagram of an example of a computing system according to some embodiments of the invention.

FIGS. 1 and 2 are block diagrams of examples of computing systems according to embodiments of the invention, and provide examples for the operations described in FIGS. 3-6. The following discussion is intended to provide a general description of a suitable environment in which certain aspects of the invention may be implemented. As used herein, the term "computing system" is intended to broadly encompass a single machine, or a system of communicatively coupled machines or devices operating together. Exemplary computing systems include, without limitation, distributed computing systems, supercomputers, computing clusters, mainframe computers, mini-computers, client-server systems, personal computers, workstations, servers, portable computers, laptop computers, tablet processing systems, telephones, personal digital assistants (PDAs), handheld devices, mobile handsets, entertainment devices such as audio and/or video devices, and other devices for processing or transmitting information.

The systems of FIGS. 1 and 2, for example, may be implemented as an integrated circuit (IC). The components of the systems may be coupled to one or more volatile or non-volatile data storage devices, as one of ordinary skill in the art would appreciate. As such, the figures do not include every possible component of a computing system. The computing system may also be communicatively coupled to mass storage devices, such as one or more integrated drive electronics (IDE) drives, small computer systems interface (SCSI) drives, or other types of hard disk drives. According to embodiments of the invention, other types of mass storage devices and storage media that may be used by the computing system may include floppy disks, optical storage, tapes, memory sticks, digital video disks, biological storage, etc.

Furthermore, the computing system may also include one or more bus bridges. One or more of those bridges and associated buses may be used to connect processor illustrated in FIG. 1, either directly or indirectly, with additional components, such as one or more storage devices, device controllers, input/output (I/O) ports, and I/O devices. For example, the additional components may include a video controller, a SCSI controller, a network controller, a universal serial bus (USB) controller, a keyboard controller, etc. In some embodiments of the invention, such components may be implemented as embedded devices, using components such as programmable or non-programmable logic devices or arrays, application-specific integrated circuits (ASICs), embedded computers, smart cards, and the like.

FIG. 1 shows a processor 110 having a plurality of cores 112 (112a-112b), where each core 112 is fully functional with instruction fetch units, instruction decoders, level one (L1) cache 114 (114a-114b), execution units, and so on. While the illustrated processor 110 has two cores 112, the embodiments of the invention are not so limited. Indeed, the techniques described herein can be useful for any multi-core architecture for which power consumption is an issue of concern. Thus, any number of cores may be used without parting from the spirit and scope of the embodiments described herein.

Each core 112 is able to detect a command that requests a transition of the core 112 to an idle state. The command may originate internally within the core 112 or external to the core 112. The idle state could be a processor power state such as one of the "C states" described in the ACPI specification. Generally, deeper idle states are associated with lower power consumption and longer exit latency. Other approaches may also be used, such as, but not limited to the direct monitoring of processor frequency, processor voltage, etc.

The processor 110 can have a level two (L2) cache 120 that is shared by the cores 112. The L1 caches 114, on the other hand, may be dedicated to their respective cores 112. As will be discussed in greater detail below, the dedicated nature of the L1 caches 114 provides an opportunity for per-core power management. The cores 112 also have dedicated clock inputs 115 (115a-115b) that can be gated to obtain power savings on a per core basis. Hardware coordination logic 116 can manage power consumption of a given core 112 based on the command and an idle state status 118 (118a-118b) of each of the plurality of cores 112. By coordinating multiple cores 112 and multiple idle state statuses 118, the illustrated processor 110 is able to support more complex architectures and can respond more quickly to condition changes than traditional software approaches. The illustrated processor 110 can also use the coordination logic 116 to initiate power saving features in advance of actual power state transitions. The result can be significant power savings.

For example, it might be determined that, based on a lack of utilization, the C4 state is appropriate for the first core 112a. The C4 state, which is deep in relation to the other power management states, is typically associated with a shared resource such as a package-wide voltage and/or frequency setting. The second core 112b, on the other hand, may be in an active state. Under such conditions, the coordination logic 116 could transition the first core to a "tentative" state that involves the initiation of certain dedicated power saving features so that the first core 12a is still able to conserve power. Furthermore, if the second core 112b subsequently receives a request to transition to the C4 state, the coordination logic 116 can also initiate shared power saving features to conserve more power while the cores 112 are being transitioned into the C4 state. Similar advantages can be achieved for the other idle states by detecting when all cores are transitioning to the same state.

According to embodiments of the invention, one or more operating systems (OSes) 122 may be run on the processor 110. In some embodiments, the OS 122 may be loaded into a memory (not shown) both of which are accessible to the processor 110. ACPI logic 124 may be instantiated within the OS 122 to provide at least the above-described features, and may further provide the state information for the embodiments of the invention, as described elsewhere herein. In some embodiments of the invention, the OS 122 and ACPI logic 124 may be stored in a mass storage device (not shown), such as but not limited to, a hard disk.

FIG. 2 shows a system 222 having a processor 110' with a plurality of cores 112' (112a'-112b') and hardware coordination logic 116' as already described. The illustrated system 222 also includes one or more input/output (I/O) devices 224, a random access memory (RAM) 226 and a read only memory (ROM) 228 coupled to the processor 110' by way of a chipset 230. The RAM 226 and ROM 228 store instructions 232 that can be executed as one or more threads and/or processes by the cores 112', where execution of the instructions 232 can lead to increased power consumption. As idle state transition commands are received by the cores 112' from the chipset 230 and/or operating system, the hardware coordination logic 116' is able to substantially reduce power consumption for the system 222.

According to embodiments of the invention, one or more OSes 122' may be run on the processor 110'. ACPI logic 124' may be instantiated within the OS 122' to provide at least the above-described features, and may further provide the state information for the embodiments of the invention, as described elsewhere herein. In some embodiments of the invention, the OS 122' and ACPI logic 124' may be stored in a mass storage device (not shown), such as but not limited to, a hard disk.

Embodiments of the invention involve detecting an OS's entry into (and exit out of) processor power states, such as, but not limited to processor power management states that indicate an OS's idleness. According to embodiments of the invention, once the processor power management states entry/exit is detected, the OS's scheduler may be augmented with platform and/or user specific preferences alongside with the knowledge of foreground vs. background applications to manage scheduling and/or power management.

In some embodiments of the invention, the method and apparatus may perform detection of entry into and exit from processor power management states by the OS idle handlers and/or OS scheduler, referenced herein, which may operate within the OS. The invention may be described by reference to or in conjunction with associated data including instructions, functions, procedures, data structures, application programs, etc. which when accessed by a machine result in the machine performing tasks or defining abstract data types or low-level hardware contexts. The data may be referred to in general as software, and it may be stored in volatile and/or non-volatile data storage.

Figure 3:
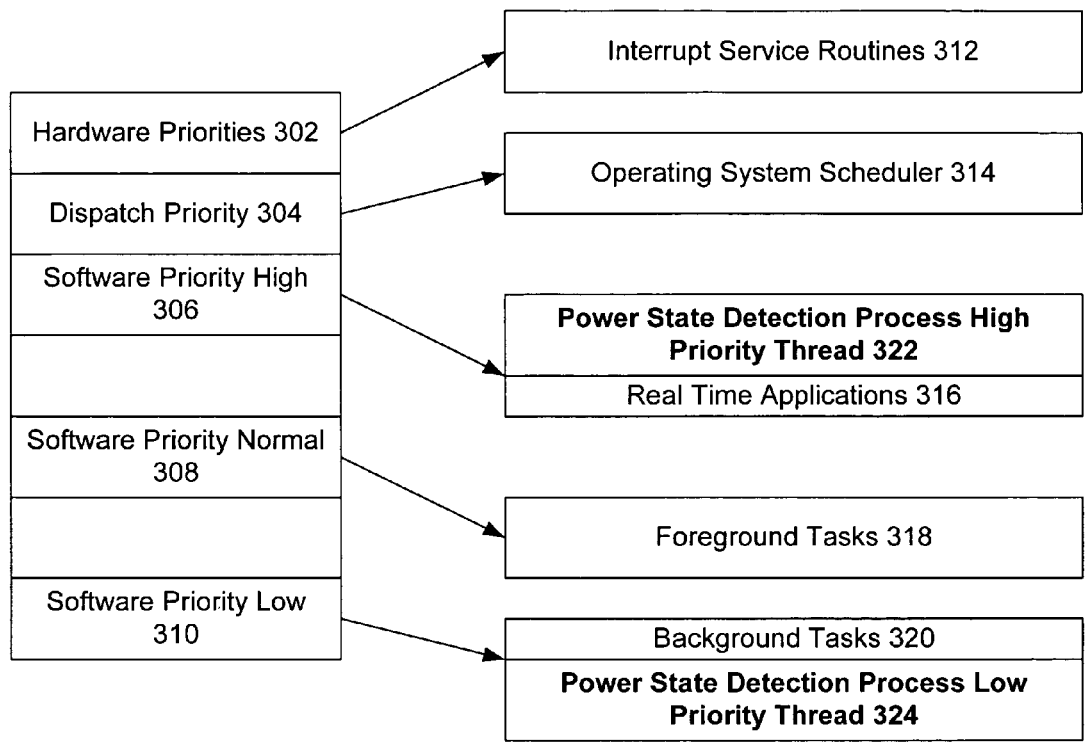
FIG. 3 is a block diagram of an example process and thread priorities in an exemplary operating system with example power state entry/exit detection threads according to some embodiments of the invention.

FIG. 3 shows process and thread priorities assigned by an OS. As shown by block diagram 300, the priorities are categorized on the left side of the figure in a vertical arrangement, which is for only for ease of understanding, and listed respectively as hardware priorities 302, dispatch priority 304, software priority high 306, software priority normal 308, and software priority low 310. Along the right side of FIG. 3 are the threads, which are associated with one or more processes, as indicated by the arrows. In some embodiments, the Interrupt Service Routines 312 as associated with the hardware priorities 302; the OS Scheduler 314 is associated with the dispatch priority 304, and, as shown in this embodiment, has a higher priority than the software applications, which are indicated by blocks 306, 308 and 310. According to embodiments of the invention, the OS Scheduler 314 may also decide which thread and process should execute at the next time quantum. Also, typically there may be an OS idle handler sitting at a lower priority (including at least one of blocks 306, 308, and 310) and not exposed to applications that will determine when to put the processor in a low power state.

Also shown in FIG. 3, real time applications 316 is associated with software priority high 306. The real time applications 316 may include software applications which are intended to be accessed directly by the user, and may require a greater portion of the processing resources of the computing system. According to some embodiments of the invention, a Power State Detection Process High Priority Thread 322 may be instantiated along with the real time applications 316, and may be in association with the software priority high 306.

One or more foreground tasks 318 may be associated with the software priority normal 308, according to embodiments of the invention. Also, in some embodiments of the invention, background tasks 320 may be associated with the software priority low 310. The background task 320 may include software applications which are not intended to be accessed directly by a user, and typically operate without consideration of power management. According to some embodiments of the invention, a power state detection process low priority thread 324 may be instantiated along with the background tasks 320, and may be in association with the software priority low 310.

According to embodiments of the invention, a mechanism may approximately detect in an OS independent manner when the OS is about to put the processor in a low power state due to idleness and also to detect when the processor has woken up from the low power state to a normal running state to execute applications. In some embodiments of the invention, this may be accomplished by creating at least one process with two threads where one thread has a higher priority than other applications on a typical system and another thread has the least possible priority that an application thread can have. As shown in FIG. 3, the threads 322 and 324 may be instantiated as the highest and lowest threads, respectively.

Furthermore, the present invention is not limited to a particular OS, but may be employed in computing systems that use a wide variety of different OSes.

Figure 4:
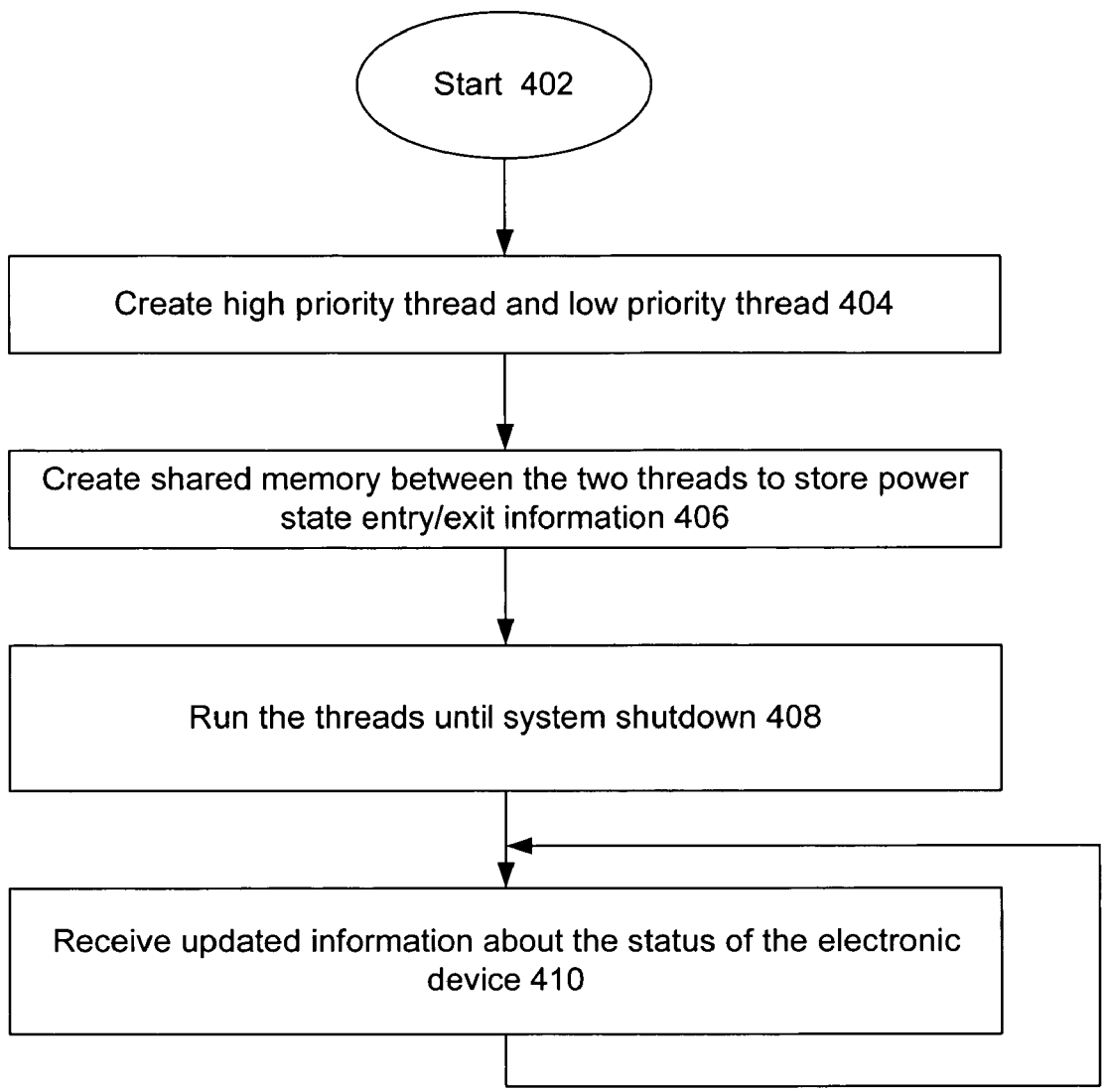
FIG. 4 is a flowchart of an example of process for initiation of power state detection according to some embodiments of the invention.
Figure 5:
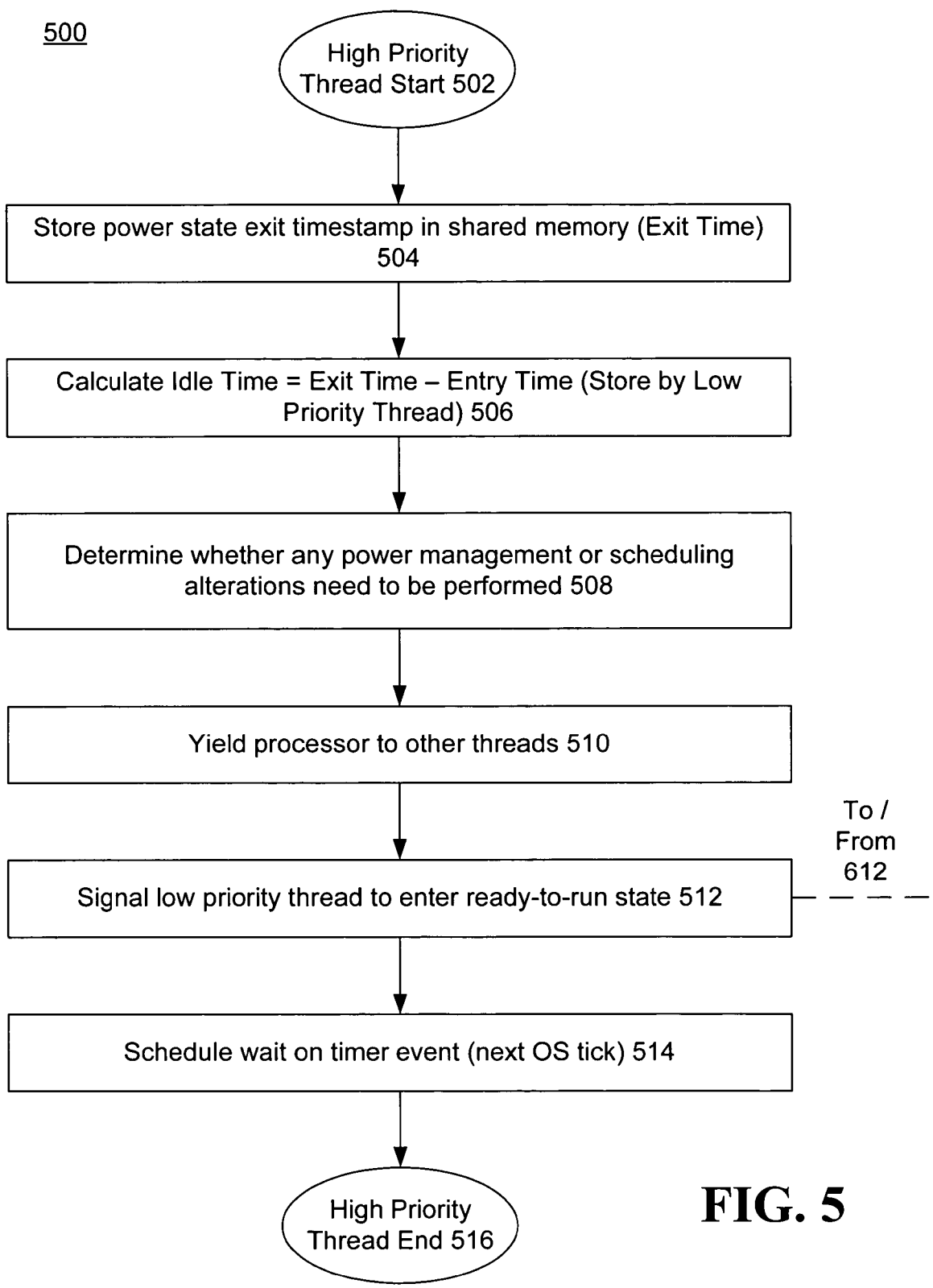
FIG. 5 is a flowchart of an example of process for a high priority detection thread according to some embodiments of the invention.
Figure 6:
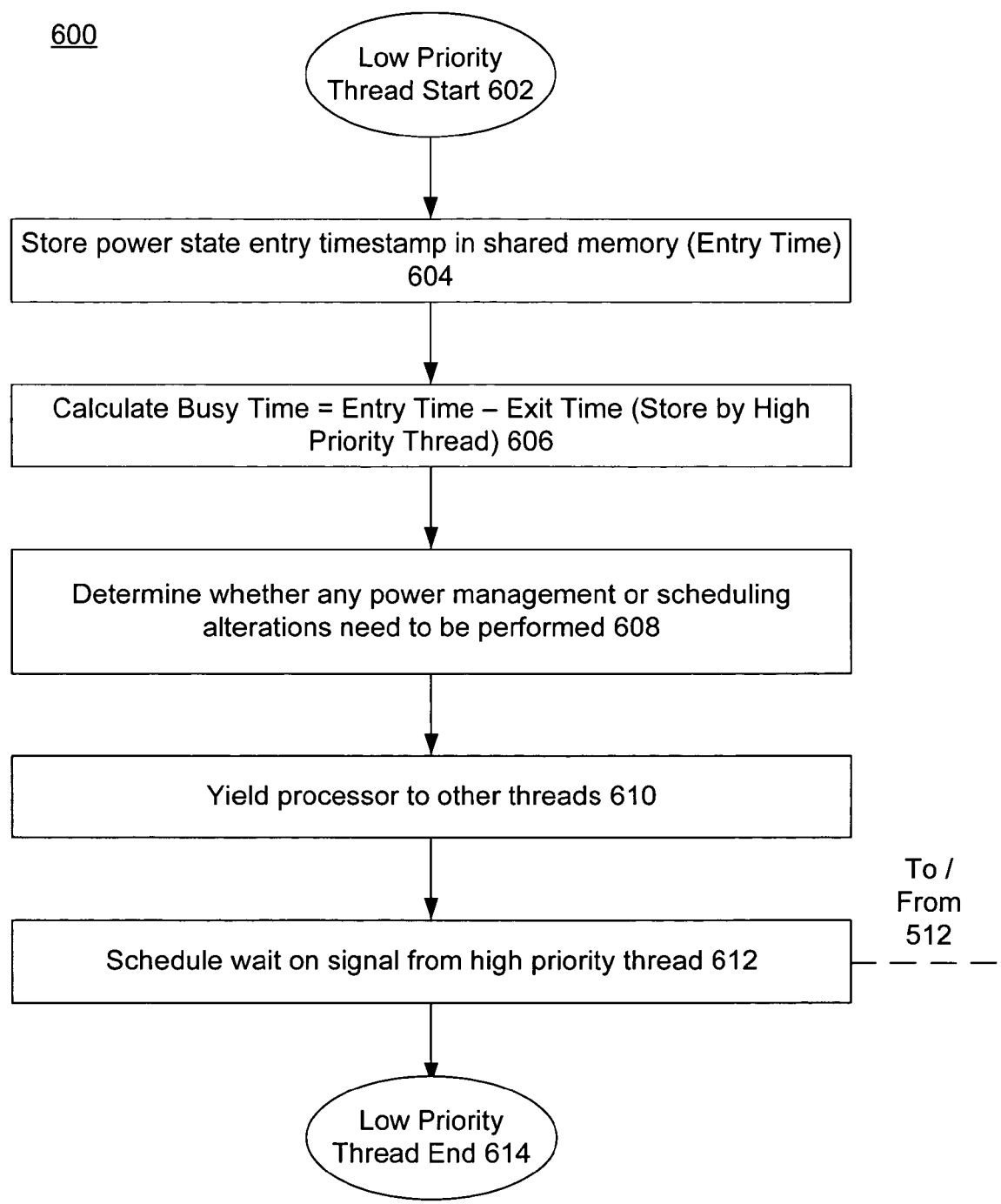
FIG. 6 is a flowchart of an example of process for a low priority detection thread according to some embodiments of the invention.

The methods of FIGS. 4-6 may be performed, as discussed elsewhere herein, by one or more of the modules of the computing system shown and discussed with respect to FIGS. 1 and 2. In particular, according to embodiments of the invention, the OS 122 and 122' and the ACPI 124 and 124' may provide some or all of the logic for the invention. FIGS. 4-6 describe embodiments of the invention without unnecessary reference to the logical and physical modules of the computing system upon which they may be instantiated.

FIG. 4 shows a flowchart of how the power states entry/exit by an OS idle handler may be detected, according to some embodiments of the invention. As can be seen, the detection processing may be done by the two threads created by a detection application. The process 400 begins at start 402 and immediately proceeds to create a high priority thread and low priority thread at 404. The process then proceeds to 406 where the process creates a shared memory between the two threads to store power state entry/exit information. In some embodiments of the invention, the process runs the two threads until system shutdown 408. According to an embodiment of the invention, the process may receive updated information about the status of the electronic device 410. The electronic device may include the computer system, or one or more modules of the computing system, such as the multi-core processor of FIG. 1. The process may then proceed to repeat at 410, as indicated in FIG. 4.

FIG. 5 illustrates in a flow chart of the high priority thread, according to an embodiment of the invention. The process 500 for the thread starts at 502 and proceeds immediately to 504. At 504, the process stores a power state exit timestamp in a shared memory. This timestamp may be called an Exit Time. The process then proceeds to 506. At 506, the process calculates an idle time by subtracting an Entry Time from the Exit Time. In some embodiments of the invention, the idle time is stored by the low priority thread. The process then proceeds to 508, where, in some embodiments of the invention, the process determines whether any other power management or scheduling alterations need to be done based on user inputs and/or knowledge of background vs. foreground processes. The process then yields the processor to other threads at 510 and proceeds to 512. At 512, the process signals the low priority thread to enter a ready-to-run state. In embodiments of the invention, the process communicates with the Low Priority Thread 600 at 612, described below. The process then proceeds to schedule a wait-on-timer event for the next OS timer tick at 514, and then ends at 516, where, in some embodiments of the invention, the process 500 may be repeated as necessary.

FIG. 6 illustrates in a flow chart of the low priority thread, according to an embodiment of the invention. The process 600 for the thread starts at 602 and proceeds immediately to 604. At 604, the process stores power state entry timestamp in a shared memory. This timestamp may be called an Entry Time. The process then proceeds to 606. At 606, the process calculates a busy time by subtracting an Exit Time from an Entry Time. In some embodiments of the invention, the busy time is stored by the high priority thread. The process then proceeds to 608, where, in some embodiments of the invention, the process determines whether any other power management or scheduling alterations need to be done based on user inputs and/or knowledge of background vs. foreground processes. The process then yields the processor to other threads at 610 and proceeds to 612. At 612, according to some embodiments of the invention, the process schedules a wait on signal from high priority thread, where the process 600 may communicate with the High Priority Thread 500 at 512. The process 600 then proceeds to 614, where it ends and may be repeated as necessary.

According to embodiments of the invention, the Low Priority thread 600 may get a chance to run when, for example, the OS scheduler determines the schedule order based on the priority and when the low priority thread comes last just before entry into power states associated with sleep, rest, or similar low levels of operation. Therefore, it may be a very good indication that the next time quantum will be used by the OS idle handler and hence would result in an entry into a power state. Similarly, since the high priority thread 500 may be made to run at the highest priority among all the software application threads, according to embodiments of the invention, it would typically be granted the first chance to execute after all hardware interrupts are serviced. The result of this process, according to some embodiments of the invention, may give an indication of when the OS exits the power states and when the user mode execution begins.

In other words, in some embodiments, the low priority thread may run just prior to entry into an idle or low power state; and the high priority thread may run when the idle state is ended or the highest power state is reached. In some embodiments of the invention, either or both of the threads may yield to other threads as soon as they complete their task. One way to accomplish this is to put those threads into a sleeping state for the minimum amount of time that is allowed by the operating system. This may keep those threads in sleeping state until the next timer interrupt and give other threads, including OS idle handler, a chance to run.

In some embodiments of the invention, knowledge of the user mode execution and an indication of power state transitions or other activity can be greatly helpful in determining and optimizing the various application execution models. For example, in some embodiments of the invention, a scheduler helper management application may decide when and on which processor/core, if more than one is present, a particular process should run, with additional knowledge about the specific application that the OS scheduler doesn't typically know. For example, in an embodiment of the invention, an application management console may also use this information to opportunistically run background threads when one processor in a shared processor topology is active. This type of intelligent dispatching maximizes package power state opportunity by running processes in parallel. This type of technique may be especially useful in processors that have shared voltage rail implementations.

The invention described here could be implemented in a management application that takes in the additional specific knowledge about each process run on a system and alter the scheduling of those applications to, among other things, effectively improve performance, user experience, power consumption, etc.

Typically, the decision on when the processor is idle and when it should be used to execute application code is decided by the OS. However, according to embodiments of the invention, the method and apparatus may enable software outside of the OS to effectively detect CPU idle times. This technique may allow such a solution to be added on top of commercial operating systems.

Embodiments of the invention may be described in sufficient detail to enable those skilled in the art to practice the invention, including the practice of the invention on a computing system or similar machine, which has been described in relevant part herein. Other embodiments may be utilized, and structural, logical, and intellectual changes may be made without departing from the scope of the invention.

In light of the principles and example embodiments described and illustrated herein, it will be recognized that the illustrated embodiments can be modified in arrangement and detail without departing from such principles. For instance, although one or more example embodiments have been described, for purposes of illustration, with regard to a battery powered device such as a cellular telephone, PDA, laptop computer, tablet computer, or other portable processing system, the present invention is not limited to utilization in such systems, but may also be used to advantage in many other types of systems, such as desktop computers, servers, etc. Accordingly, although one of the primary benefits for some implementations or embodiments of the invention may be extended battery life by making software applications aware of processor power state changes, other benefits may be more important in other implementations or embodiments. For example, noise and heat reductions may be the primary benefits in some implementations or embodiments, and reduced energy costs may be a primary benefit in other implementations or embodiments.

Alternative embodiments of the invention also include machine accessible media encoding instructions for performing the operations of the invention. Such embodiments may also be referred to as program products. Such machine accessible media may include, without limitation, storage media such as floppy disks, hard disks, CD-ROMs, DVDs, ROM, and RAM; as well as communications media such antennas, wires, optical fibers, microwaves, radio waves, and other electromagnetic or optical carriers. Accordingly, instructions and other data may be delivered over transmission environments or networks in the form of packets, serial data, parallel data, propagated signals, etc., and may be used in a distributed environment and stored locally and/or remotely for access by single or multiprocessor machines.

It should also be understood that the hardware and software components depicted herein represent functional elements that are reasonably self contained so that each can be designed, constructed, or updated substantially independently of the others. In alternative embodiments, many of the components may be implemented as hardware, software, or combinations of hardware and software for providing the functionality described and illustrated herein.

Moreover, it is to be understood that various embodiments of the invention, although different, are not necessarily mutually exclusive. For example, a particular feature, structure, or characteristic described in some embodiments may be included within other embodiments. Those skilled in the art can appreciate from the foregoing description that the techniques of the embodiments of the invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A method, comprising:
    creating a high priority thread to be executed by a processor at substantially a highest priority among other threads;
    creating a low priority thread to be executed by a processor at substantially a lowest priority among other threads;
    creating a shared memory, wherein the shared memory is accessible by the high priority thread and the low priority thread; and
    detecting power management state transitions for a processor using the high priority thread that is executed by the processor when an idle state is ended or a high power state is reached and the low priority thread that is executed by the processor prior to entry into an idle or low power state.

2. The method of claim 1, further comprising:
    storing power management state entry information in the shared memory; and
    storing power management state exit information in the shared memory.

3. The method of claim 2, further comprising:
    updating the power management state entry information and/or the power management state exit information in the shared memory.

4. The method of claim 1, the high priority thread comprising:
    storing a power state exit time in the shared memory;
    calculating an idle time by subtracting a power state entry time from the power state exit time;
    signaling the low priority thread to enter a ready-to-run state; and
    scheduling a wait-on-timer event.

5. The method of claim 1, the low priority thread comprising:
    storing a power state entry time in the shared memory;
    calculating a busy time by subtracting a power state exit time from the power state entry time; and
    scheduling a wait-on-signal state from the high priority thread.

6. The method of claim 1, wherein at least one of the high priority thread or the low priority thread determines whether other thread and/or process requires resources in use by either of the high priority thread or the low priority thread and yields the resources to the other threads.

7. The method of claim 1, wherein the power management state entry information and the power management exit information includes processor power management state information.

8. An article comprising a computer-readable storage medium containing instructions that if executed by a processor enable a system to:
    creating a high priority thread to be executed by a processor at substantially a highest priority among other threads;
    creating a low priority thread to be executed by a processor at substantially a lowest priority among other threads;
    creating a shared memory, wherein the shared memory is accessible by the high priority thread and the low priority thread; and
    detecting power management state transitions for a processor using the high priority thread that is executed by the processor when an idle state is ended or a high power state is reached and the low priority thread that is executed by the processor prior to entry into an idle or low power state.

9. The article of claim 8, comprising instructions that if executed enable the system to:
    storing power management state entry information in the shared memory; and
    storing power management state exit information in the shared memory.

10. The article of claim 9, comprising instructions that if executed enable the system to:
    updating the power management state entry information and/or the power management state exit information in the shared memory.

11. The article of claim 8, the high priority thread comprising:
    storing a power state exit time in the shared memory;
    calculating an idle time by subtracting a power state entry time from the power state exit time;
    signaling the low priority thread to enter a ready-to-run state; and
    scheduling a wait-on-timer event.

12. The article of claim 8, the low priority thread comprising:
    storing a power state entry time in the shared memory;
    calculating a busy time by subtracting a power state exit time from the power state entry time; and
    scheduling a wait-on-signal state from the high priority thread.

13. The article of claim 8, wherein at least one of the high priority thread or the low priority thread determines whether other thread and/or process requires resources in use by either of the high priority thread or the low priority thread and yields the resources to the other threads.

14. The article of claim 8, wherein the power management state entry information and the power management exit information includes processor power management state information.

15. An apparatus, comprising:
    a machine accessible medium, and
    instructions encoded in the machine accessible medium, wherein the instructions, when executed in a computing system, cause the computing system to perform operations comprising:
    creating a high priority thread to be executed by a processor at substantially a highest priority among other threads;

creating a low priority thread to be executed by a processor at substantially a lowest priority among other threads;

creating a shared memory, wherein the shared memory is accessible by the high priority thread and the low priority thread; and detecting power management state transitions for a processor using the high priority thread that is executed by the processor when an idle state is ended or a high power state is reached and the low priority thread that is executed by the processor prior to entry into an idle or low power state.

16. The apparatus of claim 15, the instructions further comprising:

storing power management state entry information in the shared memory; and storing power management state exit information in the shared memory.

17. The apparatus of claim 16, the instructions further comprising:

updating the power management state entry information and/or the power management state exit information in the shared memory.

18. The apparatus of claim 15, the high priority thread comprising:

storing a power state exit time in the shared memory;

calculating an idle time by subtracting a power state entry time from the power state exit time;

signaling the low priority thread to enter a ready-to-run state; and scheduling a wait-on-timer event.

19. The apparatus of claim 15, the low priority thread comprising:

storing a power state entry time in the shared memory;

calculating a busy time by subtracting a power state exit time from the power state entry time; and scheduling a wait-on-signal state from the high priority thread.

20. The apparatus of claim 15, wherein at least one of the high priority thread or the low priority thread determines whether other thread and/or process requires resources in use by either of the high priority thread or the low priority thread and yields the resources to the other threads.

21. The apparatus of claim 15, wherein the power management state entry information and the power management exit information includes processor power management state information.

22. A computing system, comprising:

a machine accessible medium;

a processor responsive to the machine accessible medium; and instructions encoded in the machine accessible medium, wherein the instructions, when executed by the processor, perform operations comprising:

creating a high priority thread to be executed by a processor at substantially a highest priority among other threads;

creating a low priority thread to be executed by a processor at substantially a lowest priority among other threads;

creating a shared memory, wherein the shared memory is accessible by the high priority thread and the low priority thread; and detecting power management state transitions for a processor using the high priority thread that is executed by the processor when an idle state is ended or a high power state is reached and the low priority thread that is executed by the processor prior to entry into an idle or low power state.

23. The computer system of claim 22, the instructions further comprising:

storing power management state entry information in the shared memory; and storing power management state exit information in the shared memory.

24. The computer system of claim 23, the instructions further comprising:

updating the power management state entry information and/or the power management state exit information in the shared memory.

* * * * *